(12) United States Patent
Neber et al.

(10) Patent No.: US 10,432,122 B2
(45) Date of Patent: Oct. 1, 2019

(54) METHOD FOR SENSOR-FREE DETERMINATION OF THE ROTOR POSITION OF ELECTRONICALLY COMMUTATED MULTIPLE-PHASE SYNCHRONOUS MACHINES

(71) Applicant: ebm-papst Mulfingen GmbH & Co. KG, Mulfingen (DE)

(72) Inventors: Markus Neber, Kuenzelsau (DE); Thomas Ley, Weikersheim-Laudenbach (DE); Jens Krotsch, Niederstetten (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 15/562,311

(22) PCT Filed: Mar. 10, 2016

(86) PCT No.: PCT/EP2016/055196
§ 371 (c)(1),
(2) Date: Sep. 27, 2017

(87) PCT Pub. No.: WO2016/156006
PCT Pub. Date: Oct. 6, 2016

(65) Prior Publication Data
US 2018/0351495 A1 Dec. 6, 2018

(30) Foreign Application Priority Data

Mar. 31, 2015 (DE) .................. 10 2015 105 007

(51) Int. Cl.
*H02P 21/18* (2016.01)
*H02P 6/16* (2016.01)

(52) U.S. Cl.
CPC ............... *H02P 21/18* (2016.02); *H02P 6/16* (2013.01)

(58) Field of Classification Search
USPC ......................................................... 318/400
See application file for complete search history.

(56) References Cited

U.S. PATENT DOCUMENTS 5,525,886 A * 6/1996 Lyons ..................... H02P 6/185
 318/400.13
5,726,543 A * 3/1998 Park .......................... H02P 6/21
 318/400.09

(Continued)

FOREIGN PATENT DOCUMENTS

| AT | 395487 B | 1/1993 |
| DE | 4116085 A1 | 11/1992 |

(Continued)

OTHER PUBLICATIONS

International Search Report (in German with English Translation) for PCT/EP2016/055196, dated Jun. 9, 2016; ISA/EP.

*Primary Examiner* — Shawki S Ismail
*Assistant Examiner* — Devon A Joseph
(74) *Attorney, Agent, or Firm* — Harness, Dickey & Pierce, P.L.C.

(57) ABSTRACT

The invention relates to a method for sensor-free position determination of the rotor position of an electronically commutated multiple-phase EC motor comprising a rotor, and a stator and comprising a commutation device for generating string currents in the coil system of the stator by applying a test signal in the coil system, measuring the current value i in the strand during the measurement phase (PHMess) as a current response to the test signal, calculating i for determining the envelope determining of the current response and determining the rotor position therefrom.

14 Claims, 6 Drawing Sheets

(56) References Cited

U.S. PATENT DOCUMENTS

| | | | | |
|---|---|---|---|---|
| 5,886,486 A | * | 3/1999 | Jeong | ............... H02P 6/15 |
| | | | | 318/400.13 |
| 6,011,377 A | * | 1/2000 | Heglund | ............ H02P 9/40 |
| | | | | 318/254.2 |
| 6,172,498 B1 | * | 1/2001 | Schmidt | ............ G01D 5/2006 |
| | | | | 318/685 |
| 6,483,270 B1 | * | 11/2002 | Miyazaki | ........ G05B 19/231 |
| | | | | 318/609 |
| 7,138,776 B1 | * | 11/2006 | Gauthier | ............ H02P 6/10 |
| | | | | 318/400.34 |
| 7,253,582 B1 | * | 8/2007 | Ding | ............ G11B 19/20 |
| | | | | 318/259 |
| 7,334,854 B1 | | 2/2008 | Chang et al. | |
| 8,294,397 B2 | | 10/2012 | Horng et al. | |
| 2003/0193306 A1 | * | 10/2003 | Griffitts | ............ H02P 6/18 |
| | | | | 318/459 |
| 2006/0043915 A1 | * | 3/2006 | Kim | ............ H02P 6/18 |
| | | | | 318/400.02 |
| 2007/0085508 A1 | * | 4/2007 | Fujitsuna | ............ H02P 6/185 |
| | | | | 318/712 |
| 2010/0181952 A1 | | 7/2010 | Cheng | |
| 2010/0237817 A1 | * | 9/2010 | Liu | ............ H02P 21/0007 |
| | | | | 318/400.34 |
| 2015/0177297 A1 | | 6/2015 | Schwarzkopf | |

FOREIGN PATENT DOCUMENTS

| | | |
|---|---|---|
| DE | 102012212766 A1 | 1/2014 |
| EP | 2061147 A2 | 5/2009 |

* cited by examiner

METHOD FOR SENSOR-FREE DETERMINATION OF THE ROTOR POSITION OF ELECTRONICALLY COMMUTATED MULTIPLE-PHASE SYNCHRONOUS MACHINES

CROSS REFERENCE TO RELATED APPLICATIONS

This application is a U.S. National Phase Application under 35 U.S.C. 371 of International Application No. PCT/EP2016/055196 filed on Mar. 10, 2016 and published in German as WO 2016/156006 A1 on Oct. 6, 2016. This application claims priority to German Application No. 10 2015 105 007.2 filed on Mar. 31, 2015. The entire disclosures of all of the above applications are incorporated herein by reference.

The invention relates to a method for sensor-free determination of the rotor position of electronically commutated synchronous machines, such as EC motors.

Various EC motors are known from the prior art. Thus, for example, the brushless DC (BLDC) motor is increasingly popular. Since in this type of motor there is no mechanical or electrical contact between stator and rotor of the BLDC motor, alternative requirements are needed for the motor control system in order to determine its relative position. There are two possible methods for this with BLDC motors: either sensor-controlled or sensor-free commutation.

In sensor-controlled commutation, Hall sensors are used for example to detect the magnetic flux of the rotor, or optical sensors are used in the region of the stator. Depending on the specific positional information, suitable power drivers of the electronic controls are used to actuate the rotor windings in order to generate a torque.

Especially in fan drive units, synchronous machines excited by permanent magnet are regularly used in combination with a commutation electronics. For the commutation, a pulse inverter with space vector modulation is typically used. For this, the current rotor position of the rotor must be known. This rotor position or the rotor angle relative to the stator is often determined not only by the evaluating of position detection elements as indicated above, but also by a sensor-free so-called position encoder-free method.

Accordingly, one alternative method is the sensor-free detecting of the position during which, for example, a measurement of the retroactive e.m.f. or its effects is used for the position determination. The detecting of the rotor position is done with the aid of a control system which can evaluate the back voltage triggered in the coils of the stator. However, a minimum rotary speed is needed in order to evaluate the back voltage. As a result, sensor-free EC motors have to be commutated without their position information until reaching the minimum rotary speed.

Methods are known, for example from the publications US 2010/0181952 A1, EP 2 061 147 A2, U.S. Pat. No. 8,294,397 B2 and U.S. Pat. No. 7,334,854 B1, which deal with sensor-free commutation during motor starting.

Various methods are known from the prior art for the sensor-free determination of the rotor position of the rotor of a BLDC motor. Thus, e.g., the current rotor position is determined by an evaluation of the zero crossings of the inducted back voltage (e.m.f.) in the respective non-energized winding strands, since a voltage vector induced in the winding system is related distinctly to the rotor position. However, this evaluation requires in theory a movement of the rotor. Although such a method can also be used with very slow rotation of the rotor, with decreasing speed the ascertained rotor position has increasingly large errors.

Another possibility is based on the variation in the inductance of the BLDC motor. The rotor as a permanent magnet creates, on account of saturation, a magnetic asymmetry, since the magnetic reluctance in the direction of its magnetization (d axis) is greater than that of the transverse axis (q axis). This results in an inductance of the BLCD motor which is dependent on the rotor position. The winding strand of the stator whose magnetic axis coincides with the d axis of the rotor has a minimal inductance and the winding strand whose magnetic axis coincides with the q axis, i.e., which is rotated by 90°, has a maximal inductance. In the non-energized state of the BLDC motor, the south pole and the north pole of the rotor as a permanent magnet have the same effect, and so the curve of this variable inductance has twice the periodicity of the electrical quantities. This 180°-ambiguity must be resolved for complete positional information. For this, a voltage signal is applied according to the direction of the rotor, so that as a result of the current flowing in the windings the saturation in the stator is decreased or strengthened, i.e., the corresponding inductance is decreased or increased, so that the rotor position can be determined from this.

This inductive approach to the determining of the rotor position is known for example from the publication AT 395 487 B, in which the current pulses generated by voltage pulses and corresponding voltage pulses are detected and the resulting inductances are determined. These inductance values are coordinated with a sinusoidal curve along the circumference, in order to determine from this the current position within the sinusoidal curve. In order to compensate for the e.m.f. voltage occurring during a rotating rotor in the measurement result, however, a second measurement needs to be done in this known method.

The known position encoder-free methods can basically be divided into two groups. On the one hand, there are the active methods, and on the other hand the so-called passive methods. In the active methods, besides the voltage needed for the control of the drive system, additional test voltage values are applied and their response function is evaluated. Passive methods calculate the rotor position from the fundamental harmonics of the voltage and current. They are usually based on the principle of the reactive internal voltage in the stator.

For example, from DE 102012212766 A1 there is known an active method for determining the rotor position of an electronically commutated multiple-phase DC motor (BLDC motor) with a commutation device, wherein several test voltage pulses are generated in the winding system with predetermined on period by means of the commutation device in different phase positions distributed over 360°, and then the measurement of the current values of the current responses of the test voltage pulses is performed at the end of the on period of the respective test voltage pulses and finally an approximation is made for the measured current values by a periodic approximation function from a superpositioning of a fundamental wave and the corresponding first harmonic in dependence on the phase position of the test voltage pulses. The rotor position is then determined from the determination of the amplitude ratio value of the current responses of the fundamental wave and the first harmonic of the approximation function as the e.m.f. angle from the argument of the fundamental wave of the approximation function and/or as the inductance angle from the argument of the first harmonic of the approximation function in dependence on said amplitude ratio.

The aforementioned methods have their benefits and drawbacks, depending on the application. In drive system engineering, methods working with test signals are mostly used. With these, it is possible to determine the position even at low rotary speeds, as low as standstill.

The drawback is that these drive units usually generate noise (due to the test signals) in a frequency range unpleasant to the human ear. In this respect, the passive methods have an advantage, since they do not generate any annoying noises for the position determination. The passive methods which are based on the evaluation of the internal voltage, however, require disadvantageously a certain minimum rotary speed (depending on the drive unit and the method, between 5 and 20% of the rated speed) for a dependable rotor position determination. Below this minimum speed, a definite evaluation is not possible, which is especially disadvantageous to the starting up of the drive unit. Moreover, it must be considered that, with decreasing rotor speed, the ratio of useful signal to noise becomes increasingly unfavorable in the internal voltage measurement, owing to the technical accuracy of a voltage measurement, so that the number of wrong rotor position values increases.

In order for example to bring a fan drive unit from standstill to a desired operating state, a method is needed with which the rotor position can be determined without internal voltage feedback. Such a method must be dependable and low in noise, or at least determine the relative position of the rotor while avoiding disturbing test signal noise.

The problem which the present invention proposes to solve is to overcome the aforesaid drawbacks and to provide an alternative and improved method for the sensor-free determination of the rotor position of an EC motor, especially an EC fan drive unit. An EC fan drive unit means in the context of the present invention a permanently excited synchronous machine with electronic commutation in conjunction with a fan wheel having a significantly larger moment of inertia as compared to the rotor, which affects in particular the starting and the stopping behavior.

The invention pursues the following goals, among others:
The reliable determination of the relative rotor position (reference angle between stator and rotor), which [indicates?] a deviation from the actual rotor position <60° for a direction-independent rotary movement of the rotor up to |n|<10% of the rated speed.
Keeping the noise excitation as low as possible during the determination of the rotor position and thereby putting the least energy possible into the noise excitation, instead of the position evaluation.
Time-optimized determination between the fastest possible, but noise-intensive position determination and a relative slow, but low-noise evaluation.
Estimating the starting rotary speed.
Obtaining feedback as to the degree of reliability of the result.
Ensuring the transition to static operation by coupled motion of the rotor by means of the current vector.

This problem is solved with a method for determining the relative position of a rotor of an EC drive unit with the features of claim 1.

The basic notion of the present invention is the low-noise applying of a test signal and its evaluation by means of slowly rising current signals based on a slowly rising test signal according to an at least once continuously differentiable voltage rise function, wherein the test signal according to the invention is a voltage vector depending on the application-specific frequency.

According to the invention, the voltage vector may be indicated as follows:

$$u_1 = f_d \cdot A \cdot e^{(i\omega t + \varphi)}$$

Here, the radian frequency with $\omega = 2\pi f_{Test}$ is related to the test frequency $f_{Test}$.

The parameter $\varphi$ in the exponent of the complex e-function is a freely selectable starting angle. The function $f_d$ whose value range lies in the number domain $R^1 \in [0, 1]$ indicates the test voltage amplitude A for the rising or falling phase. The preferred rising functions shall be explained more closely below.

In one advantageous sample embodiment of the method, the current rise is produced accordingly via the voltage setting. The current as well as its change generate a force on the permanent magnet in the rotor bell. According to the invention, the current is allowed to rise slowly, in an at least once continuously differentiable curve. Since the rotor in the bell itself constitutes a system capable of oscillating, the rotor consequently has an eigenfrequency and unwanted noises occur at an excitation at or near the eigenfrequency, corresponding to a resonance. The current rise and thus the time change in the currents have a direct influence on the excitation amplitudes in the frequency region of the eigenfrequency. In order to achieve low excitation amplitudes and thus low noise production, the time change in the current should occur slowly in an at least once continuously differentiable variation and not, as in the prior art, abruptly or sinusoidally.

Thus, according to the invention, a method is provided for sensor-free determination of the rotor position of an electronically commutated multiple-phase EC motor with a rotor, a stator and comprising a commutation device for generating phase currents in the coil system of the stator with at least the following steps:

a. applying a test signal $u_1$ in the coil system, wherein the test signal $u_1$ constitutes a voltage vector with radian frequency $\omega$ and the voltage amplitude A of the test signal at first rises during a rising phase $PH_{an}$ to a test voltage $U_{TEST}$ and then remains constant for a definite number of periods $N_A$ during a measurement phase $PH_{Mess}$, b. wherein the voltage rise during the rising phase $PH_{an}$ has a variation curve such that it is at least once continuously differentiable in the entire variation, and c. measuring the current value i in the strand as a current response to the test signal $u_1$, d. determining or calculating |i| for determining the envelope curve and e. determining the rotor position $\gamma_0$ by evaluating the current response.

In one advantageous embodiment, the method is designed so that, at the end of the measurement phase, there occurs either a falling phase $PH_{ab}$, during which the amplitude A of the voltage vector is further reduced according to the variation of the rise function, or a direct transition to the operation of the EC motor by commutation of the rotor by means of rotor position-dependent phase currents, after determination of the rotor position in step d).

According to the invention, the following preferred voltage rise forms are proposed, wherein the amplitude of the voltage vector follows the time-dependent function $f_d$ whose value range lies between 0 and 1:
$f_d = 0$ before the rising phase ($PH_{an}$)
$f_d = f(t)$ with $f'(t) > 0$ during the rising phase ($PH_{an}$)
$f_d = 1$ during the measurement phase ($PH_{Mess}$).
where $f'(t) = df/dt$.

If no direct transition to operation as described above occurs, but instead a falling phase occurs after the measurement phase, it is provided that the amplitude of the voltage vector moreover follows the following time-dependent function $f_d$:

$f_d = f(t)$ with $f'(t) < 0$ during the falling phase ($PH_{ab}$).

In another preferred embodiment of the invention, it is provided that the radian frequency $\omega = 2\pi f_{TEST}$ of the voltage vector is determined according to an excitation frequency between a minimum and maximum frequency, which is determined by means of frequency analysis specific to the application, preferably between 10 Hz and 500 Hz. The lowest frequency $f_{Test,min}$ depends on the ratio of the rotor inertia to the rated torque. The reason for this is to avoid an unwanted rotor pendulum motion. The maximum frequency $f_{Test,max}$ is ascertained, depending on the desired accuracy, from the ratio of the PWM frequency to the number of samples. For an accuracy of 10° el, for example, at least 37 samples are needed ($f_{Test} = 16000/37 \approx 430$ Hz).

As rise functions for the amplitude rise A in the test voltage signal one will preferably use a curve form with either linear variation, according to a sine function or according to a sigmoid function (S-function). The corresponding curve form may be used both for the rising branch of the envelope curve of the voltage vector and for the falling branch of the envelope curve of the voltage vector.

In order to ensure a sufficient long rise time to avoid disruptive noises for the rising phase it is furthermore advantageous to use a minimum number $N_A$ of periods, preferably at least 2 periods, further preferably at least 4 periods.

The method according to the invention can be employed especially advantageously on an EC fan. In order to determine the rotor position of a rotor with a rotor diameter $r_{Rotor}$ of a fan driven by an EC motor with impeller diameter $D_{Ventilator}$, it is provided that the minimum number $N_A$ of periods is determined as the rounded-off quotient of the impeller half-diameter $D_{Ventilator}$ and the rotor diameter $r_{Rotor}$.

Further preferably, the determination of the rotor position $\gamma_0$ in the aforementioned step d) is done either by polling a relative angle value $\theta$ of the voltage vector at which the amplitude value of the current vector i of the current response has a maximum or by direct calculation in a stator-fixed reference system by determining the arc-tangent of the quotient of the directional components of the current vector i. In both methods, the phase currents are transformed into a 2-axis coordinate system ($\alpha$, $\beta$-system), wherein the length of the current vector is calculated as the absolute magnitude of the root of the sum of the respective squares of the $\alpha$ and $\beta$ component of the current vector in the 2-axis coordinate system and the rotor position $\gamma_0$ in the first method is determined from the angle $\theta$ of the voltage vector at which the aforementioned length of the current vector is maximal. In one modification of the method according to the invention for determination of the rotor position $\gamma_0$ according to the above explained method, it is provided that a correction angle is furthermore determined in order to correct the ascertained angle $\theta$ of the rotor position. The need for a correction results from the factors of influence of the strand resistance $R_S$, the effective inductance $L_e$ and the test frequency. According to the invention, a correction angle can be determined as follows:

$$\varphi = \arctan(2\pi f_{Test} L_e / R_S)$$

In the second method mentioned above, the calculation is done as previously noted from the quotient of the arc-tangent of the respective $\alpha$ and $\beta$ component of the current vector in the 2-axis coordinate system for which the aforementioned length of the current vector is maximal.

In an especially advantageous modification of the method according to the invention, an internal voltage compensation is furthermore provided when determining the rotor position $\gamma_0$ in step d), wherein for each phase current one determines the mean value of the phase current and at the end of the period subtracts it from the memorized phase current variation. This technique shall be described below in the context of describing preferred sample embodiments.

Advantageous modifications of the invention are characterized in the subclaims or shall be presented more closely below, together with the description of the preferred embodiment of the invention with the aid of the figures.

There are shown.

The invention shall be explained more closely by means of the following sample embodiments with the aid of FIGS. 1 to 9, where the same reference numbers in the figures pertain to identical structural or functional features and might not be explained again in order to avoid repetition.

Figure 1:
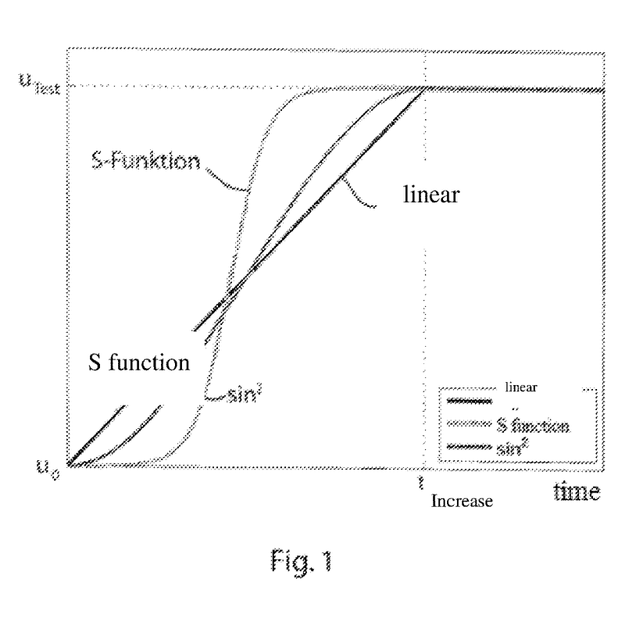
FIG. 1 envelope curves for the amplitude rise in the amplitude A of the voltage vector.
Figure 2:
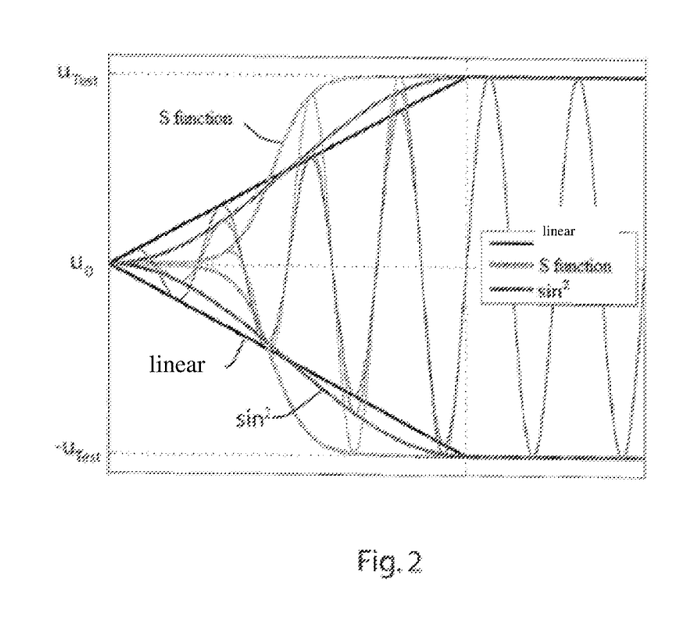
FIG. 2 envelope curves per FIG. 1, but additionally representing the phase voltage of a strand.

FIGS. 1 and 2 each represent three sample envelope curves for the amplitude rise in the amplitude A of the voltage vector $u_1$, FIG. 2 showing a rise function which reaches its maximum value after 4 periods. Besides the envelope curve, FIG. 2 additionally shows a periodic phase voltage.

The function $f_d$ has a linear variation in a first sample embodiment (linear voltage rise):

Here, the current is specified in terms of a linear increase in the voltage amplitude in the form $$f_d(t) = (f_{Test}/N_A) \cdot t$$

Figure 3:
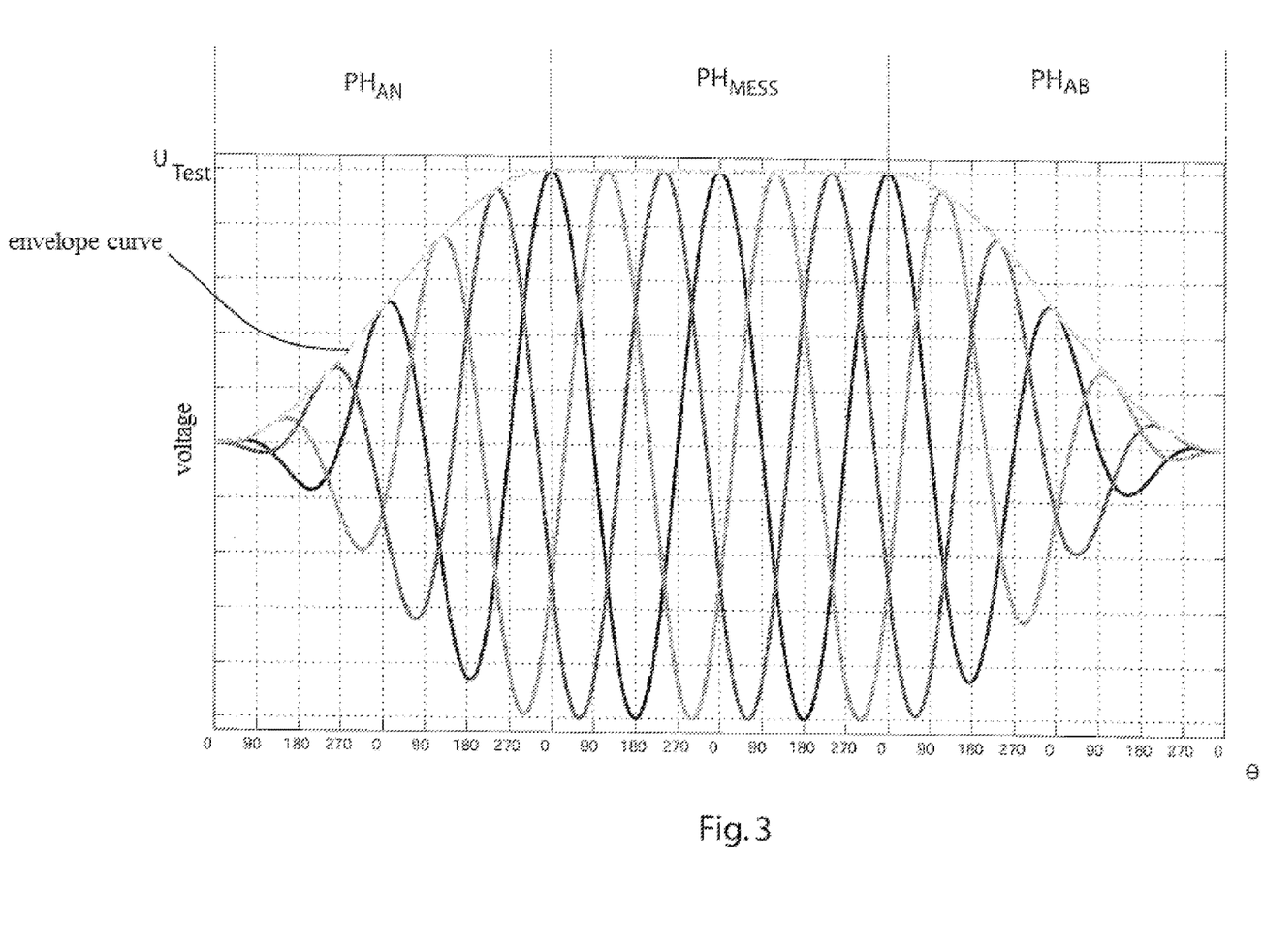
FIG. 3 the variation of a sample voltage test signal made up of rising phase, measurement phase and falling phase.

For an EC fan, the minimum number of rise periods $N_A$ is established as described above, by means of the ratio of the diameter of the application to the rotor diameter. In FIG. 2, this is the value $N_A = 4$. As of the 5th period, the measurement phase $PH_{Mess}$ begins, as can be seen in FIG. 3 following the rising phase $PH_{AN}$.

The function $f_d$ in FIGS. 1 and 2 in a second sample embodiment varies by a $\sin^2$ function:

$$f_d(t) = \sin^2((f_{Test}/N_A) \cdot (\pi/2) \cdot t)$$

The function $f_d$ in FIGS. 1 and 2 in a third sample embodiment varies by a S-function as follows:

$$f_d = \cfrac{1}{1+e^{\left(-t+\frac{4N_A^2}{i_{Test}\cdot k_d\cdot(2N_A-1)}\right)}}$$

Here, as in the second embodiment, a jolt is avoided. In addition, a stretching and shifting of the rise function is undertaken through the factor $k_d$ occurring in the argument of the e-function, which means that the rising phase is influenced. This has the further consequence that the imposed voltage values lie closer to the steady-state excitation voltage, which may result in a shorter settling phase of the current and thus an earlier evaluation of the current response. Other similar curve forms are easy to generate by variation of the parameters.

FIG. 3 shows the variation of a sample voltage test signal composed of rising phase $PH_{AN}$, measurement phase $PH_{MESS}$ and falling phase $PH_{AB}$.

Figure 4:
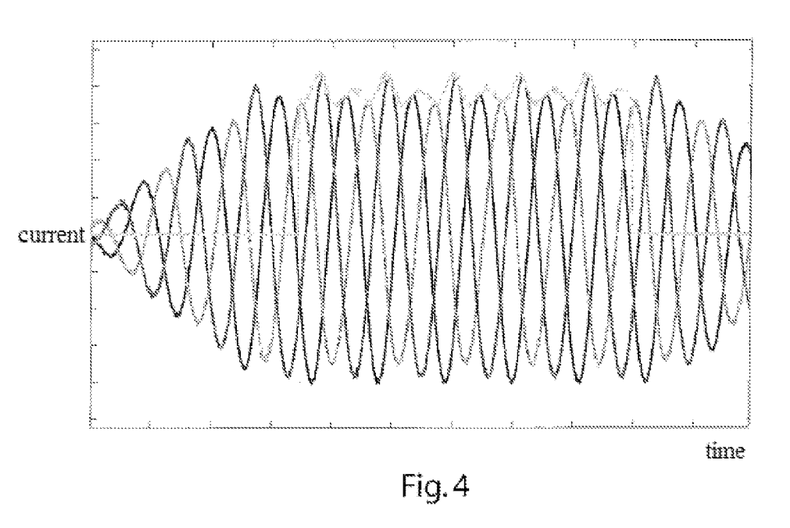
FIG. 4 representation of the resulting phase currents and the envelope curve of the current response.
Figure 5:
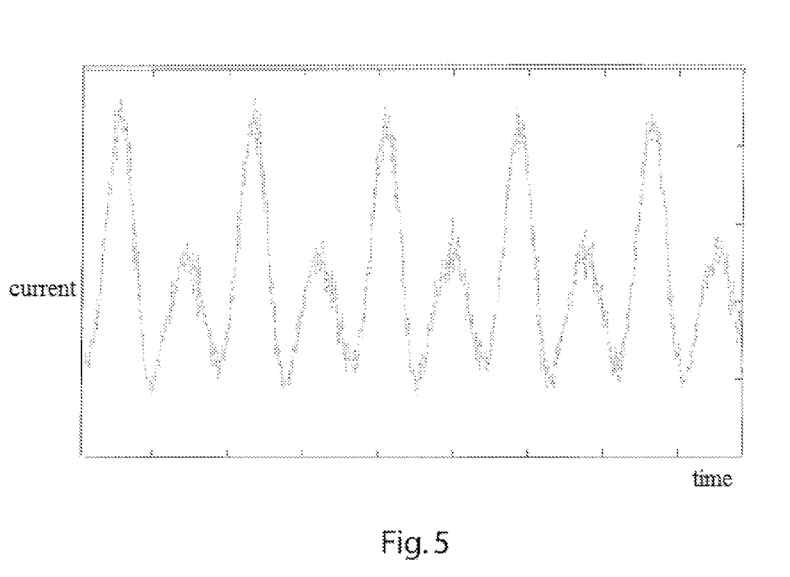
FIG. 5 detail view of the measurement phase per FIG. 4.

Another aspect of the invention concerns the evaluation of the current response, which shall be explained more closely with the aid of the representation of FIGS. 4 and 5. These show the resulting phase currents and the corresponding envelope curve of the current response. FIG. 5 here is merely an enlarged detail view of the measurement phase per FIG. 4.

This makes use of the effect that the synchronous machine excited permanently will generate its largest current response to a voltage excitation where the inductance is the lowest (or, for constant current, where the voltage is the lowest). The rotor position can therefore be established in reference to the lowest inductance.

The evaluation of the current response is done first in time in the measurement phase $PH_{Mess}$, after the end of the rising phase $PH_{AN}$, when the current variation on the envelope curve leads to the steady state. In the preferred embodiment, the rise occurs via the S-function or sine-function, since the transition to the steady-state curve occurs here "jolt-free" and is definitely continuously differentiable. The determination of the angle value θ is done without internal voltage compensation, as described above.

Additionally, according to the invention, a verification can be done for the reliability of the evaluation. For this, the method of the invention is supplemented in that the reliability Π of the evaluation is determined in an additional step and used in deciding as to the further procedure. For this, one forms the difference of the two maximum current values and compares this to a minimum value. The two maxima must lie around 180° apart. For the reliability value $$\Pi = \begin{matrix} \text{good} & \text{if } |i_{max,1} - i_{max,2}| \geq \Delta_{imax} \\ \text{poor} & \text{if } |i_{max,1} - i_{max,2}| < \Delta_{imax} \end{matrix}$$

For example, $\Delta_{imax}$ can be ascertained from previous practical experiments. Alternatively, the absolute value can be indicated with 10% of the maximum current value.

An alternative possibility of assessing the reliability is achieved by repeating the excitation and evaluation step. At least 2 complete measurement phases $PH_{Mess}$ are run through and the result compared with each other. The difference in the determined angle must not surpass an established maximum value. This step is repeated until the outcome is reliable or until an evaluation seems pointless and an error is reported in the system.

Figure 6:
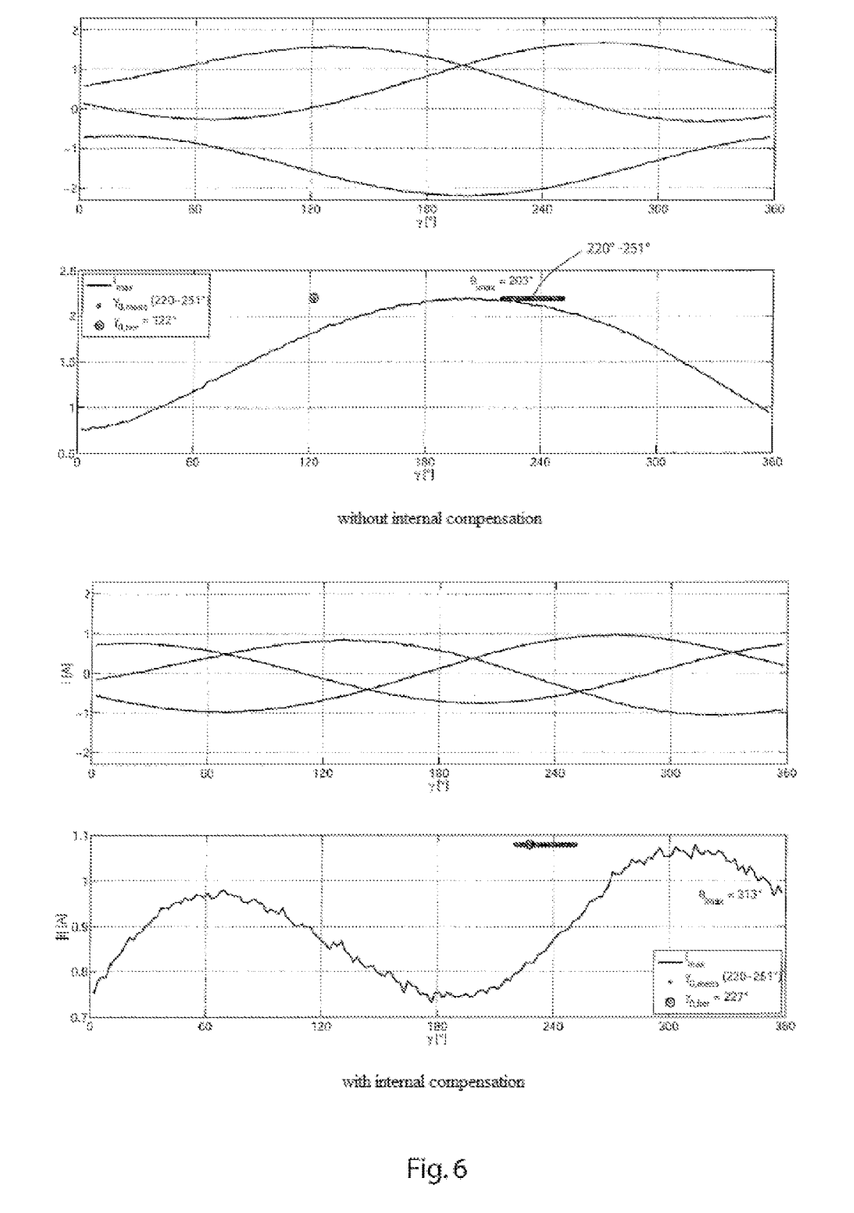
FIG. 6 representation of the effect internal voltage reaction caused by slight rotation on the determination of the rotor position, once without internal voltage compensation and then as compared to internal voltage compensation.

Another variant (variant with internal voltage compensation) is explained more closely with regard to FIG. 6. This shows a representation of the effect of the internal voltage reaction caused by slight rotation on the determination of the rotor position, once at top of (a) without internal voltage compensation and then in comparison at top of (b) with internal voltage compensation. Each time in the top part of FIG. 6 are represented the phase current variations of three strands u, v, w over a full period. In the lower representations is shown the envelope curve used for the evaluation as well as the values $\gamma_{0,mess}$ between 220° and 251° (drawn-out value range for the rotor position). Since the method is represented for a slightly turning rotor, the values here lie next to each other and appear as a drawn-out "point".

The calculated rotor position value $\gamma_{0,ber}$ in the top representation (a) is erroneous without internal compensation on account of the rotor turning and lack of a correction function. One can see the pronounced maximum which establishes the time point of the evaluation, but which leads to a wrong result. The calculated value should lie at one of the ends of the broken line $\gamma_{0,mess}$, depending on the direction of turning, since only then has the rotor position been correctly determined, as can be seen in the representation (b) with the internal compensation (see FIG. 6 with internal compensation).

In this variant, the measured phase current quantities influenced by mechanical rotor rotation have been cleaned up, so that the evaluation is possible according to the above described procedure. One determines for each strand the mean value of the phase current, and at the end of the period subtracts it from the respectively memorized phase current variation, and by this simple technique the angle determined will correspond to that of the rotor position and the value $\gamma_{0,ber}$ so calculated will correspond to a value within the measurement broken line $\gamma_{0,mess}$.

Figure 7:
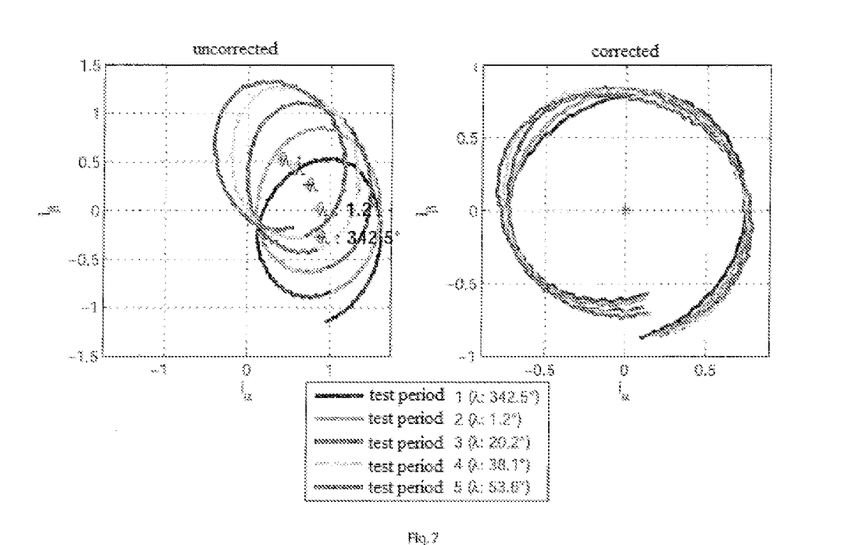
FIG. 7 representation of the rotor rotation during the measurement phase and the correction of the initial position during the rotation, and FIG. 8 calculation of the rotor rotation

FIG. 7 shows a representation of the rotor rotation during the measurement phase and the correction of the starting position during the rotation.

The method according to the invention also advantageously allows an estimation of the initial rotary speed. By evaluating the "current zero point shift" in the measured phase currents, an estimation of the rotary speed can be done with the following equation, in which the inductive component can be ignored on account of the low rotary speeds in the initial rotation range:

$$\omega = (R_s i_q)/\psi_m$$

The following modification of the method according to the invention also advantageously allows a precise determination of the rotor rotation during the measurement phase $PH_{Mess}$ and a correction of the initial position during the rotation. For this, one utilizes the fact that the movement of the center of the ellipse for a rotating rotor during the evaluation in the measurement phase $PH_{Mess}$ moves in accordance with the current rotor position. This makes possible an estimation and a sufficiently precise correction of the wrongly calculated rotor position in the previously described embodiment. For this, the mean values of the phase currents are calculated for the respective el. period with N measurement points and transformed with the generally known axial transformations into a stator-fixed reference system.

Using the difference of the calculated value, the rotor position at the end of the test phase (time span $PH_{MESS}$) is determined as follows:

$$\gamma_{0,korr} = \gamma_0 + \underline{N_{AB} \cdot \Delta\gamma_{z-1}}.$$
$$\phantom{\gamma_{0,korr} = \gamma_0 + }\gamma_{korr}$$

$$\bar{i}_{Strang,z} = \frac{1}{N}\sum_{k=1}^{N} i_{Strang,k}$$

for strand = [u, v, w] during the z-th test period $$\bar{i}_{\alpha,\beta,z} = T[\; i_{u,z} \quad i_{v,z} \quad i_{w,z}\;]^T$$

$$\Delta\gamma_{z-1} = \arctan\frac{\bar{i}_{\beta,z}}{\bar{i}_{\alpha,z}} - \arctan\frac{\bar{i}_{\beta,z-1}}{\bar{i}_{\alpha,z-1}}.$$

Here, $N_{AB}$ is the number of falling periods during which no further evaluation of the current response is done. The value $\gamma_{korr}$ constitutes the correction angle. An improvement for increasing the accuracy of the position determination is that the positive or negative velocity change of the rotor is taken into account and this correction value is used instead of the value $N_{AB} \cdot \Delta\gamma_{z-1}$. One obtains the velocity change from the angle change of the preceding measurement periods, from which a correction wert $\gamma_{korr}$ is obtained with rather high accuracy by double integration over time within the integration limits [0, $N_{AB}/f_{Test}$].

An alternative method is the extrapolation of the correction angle on the basis of the preceding angle change. From this, one obtains an angle whose change precisely corresponds to the progressive movement of the rotor during a measurement period, as shown more closely in FIG. 8. Due to the relatively large rotor inertia of fans and the associated always slight change in rotary speed, an inference can be made as to the progressive motion at the end of the evaluation.

The upper left image of FIG. 7 shows the currents in the stator-fixed coordinate system with the α current component (α-axis) and the ß current component (ß-axis). The unclosed ellipses each represent a full period of the test frequency. The opening of the ellipses is due to the rotation of the rotor. without rotor rotation, the ellipses would be closed and their center point would lie at the origin of coordinates. The centrally represented stars at the center of the ellipse with the corresponding angle indications are the calculated "center points". The calculation is done with the equations given above. To the right of this, the previously described correction is performed and one can see a corrected representation. There, the center point of the ellipses lies at the zero point of the coordinate system.

Figure 8:
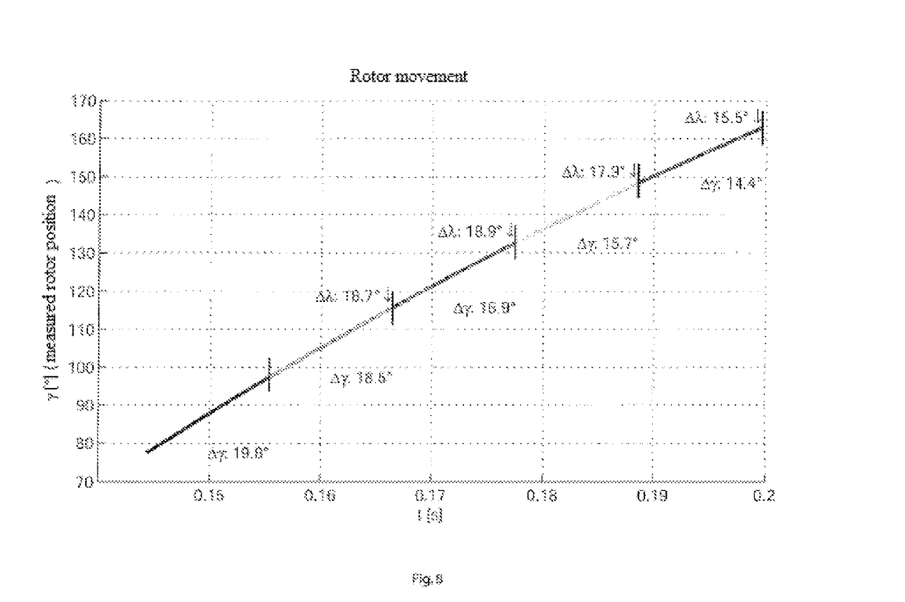
Figure 9:
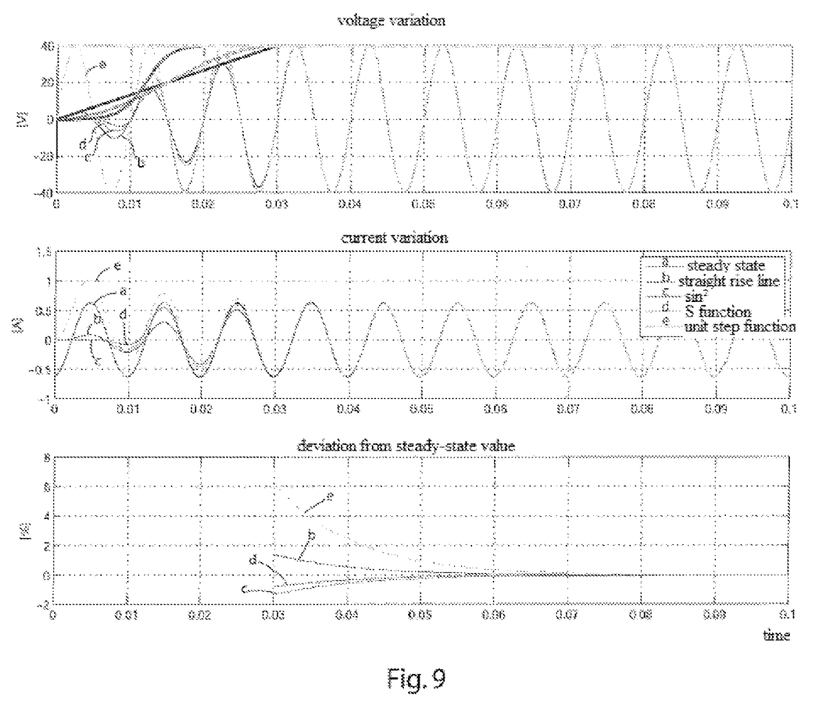
FIG. 9 illustrates a current deviation from the steady-state current variation (a) due to a chosen voltage rise (b, c, d, e).

Beneath this in FIG. 8 is shown the rotor movement measured with an angle measuring device along the time axis. The end of each one of the 5 represented measurement phases $PH_{Mess}$ is indicated by a short horizontal line. The notation Δγ is the electrical angle by which the rotor continued to turn during the measurement period. The calculated rotation and the time point of the available result are indicated by Δλ and the arrow.

The invention is not limited in its implementation to the above indicated preferred sample embodiments. Instead, a number of variants are conceivable making use of the represented solution, even in fundamentally different embodiments. Thus, one alternative embodiment of the invention is obtained in that the current rise occurs directly through a current regulation, instead of applying voltage by means of a voltage vector. One can see from FIG. 9 that the current variation likewise follows the above described rise functions. Moreover, a unit step function is shown in comparison. The curves are associated accordingly with the letters a through e. At the bottom of the figure there is shown each time the deviation in % from steady-state operation. The largest deviation in any case results for the unit step function and the smallest deviation can be seen for the sine and the S function according to the invention, as well as the straight rise lines.

The invention claimed is:

1. A method for sensor-free determination of a rotor position of an electronically commutated multiple-phase EC motor with a rotor, a stator and including a commutation device for generating phase currents in a coil system of the stator, the method comprising:
   a. applying a test signal in the coil system, wherein an amplitude A of the test signal has an envelope curve variation which at first rises during a rising phase ($PH_{an}$) and then remains constant for a definite number of periods during a measurement phase ($PH_{Mess}$),
   b. measuring a current value i in a strand during the measurement phase ($PH_{Mess}$) as a current response to the test signal,
   c. calculating the envelope curve of the current response and
   d. determining the rotor position ($\gamma_0$) of a rotor with a rotor diameter $r_{Rotor}$ of a fan driven by the EC motor with an impeller diameter $D_{Ventilator}$, a minimum number ($N_A$) of periods is determined as a rounded-off quotient of the impeller half-diameter $D_{Ventilator}$ and the rotor diameter $r_{Rotor}$, by evaluating a curve maxima of the envelope curve of the current response.

2. The method as claimed in claim 1, wherein the test signal is a test voltage signal ($u_1$) or a test current signal ($i_1$).

3. The method as claimed in claim 1, wherein, during step a), applying of the test signal $u_1$ is done in the coil system, wherein the test signal $u_1$ constitutes a voltage vector with a radian frequency (ω) and the voltage amplitude A of the voltage vector at first rises during a rising phase ($PH_{an}$) to a test voltage and then remains constant for a definite number of periods ($N_A$) during a measurement phase ($PH_{Mess}$).

4. The method as claimed in claim 3, wherein the amplitude of the voltage vector moreover follows the time-dependent function ($f_D$) whose value range lies between 0 and 1:
   $f_D=0$ before the rising phase ($PH_{an}$)
   $f_D=f(t)$ with $f'(t)>0$ during the rising phase ($PH_{an}$)
   $f_D=1$ during the measurement phase ($PH_{Mess}$).

5. The method as claimed in claim 3, wherein the amplitude of the voltage vector moreover follows the time-dependent function ($f_D$):
   $f_D=f(t)$ with $f'(t)<0$ during the falling phase ($PH_{ab}$).

6. The method as claimed in claim 5, wherein, in order to ensure a sufficiently long rise time to avoid disruptive noises for the rising phase ($PH_{an}$), a minimum number ($N_A$) of periods is selected, preferably at least 2 periods.

7. The method as claimed in claim 1, wherein the rise in the test signal during the rising phase ($PH_{an}$) has a variation curve such that it is at least once continuously differentiable in the entire variation.

8. The method as claimed in claim 7, wherein a function f(t) is a linear function, a $\sin^2$ function, or a sigmoid function.

9. The method as claimed in claim 1, wherein, at an end of the measurement phase ($PH_{Mess}$), there occurs either a falling phase ($PH_{ab}$), during which the amplitude A of the envelope curve of the test signal is further reduced according to the variation of the rise function.

10. The method as claimed in claim 1, wherein, at an end of the measurement phase ($PH_{Mess}$), there occurs a direct transition to the operation of the EC motor by commutation of the phase currents of the rotor, after determination of the rotor position in step d).

11. The method as claimed in claim 1, wherein the amplitude rise A of the test voltage signal is linear or rises according to a $\sin^2$ function or a sigmoid function (S-function).

12. The method as claimed in claim 1, wherein the determination of the rotor position ($\gamma_0$) in step d) is done by polling a relative angle value ($\theta$) of a voltage vector at which an amplitude value of a current vector (i) of the current response has a maximum or by direct calculation in a stator-fixed reference system by determining an arc-tangent of a quotient of directional components of the current vector (i).

13. The method as claimed in claim 1, wherein an internal voltage compensation is provided for determining the rotor position ($\gamma_0$) in step d), wherein for each phase current one determines a mean value of the phase current from every two current maxima and at the end of the period subtracts it from a memorized phase current variation.

14. A method for sensor-free determination of a rotor position of an electronically commutated multiple-phase EC motor with a rotor, a stator and including a commutation device for generating phase currents in a coil system of the stator, the method comprising:
  a. applying a test signal in the coil system, wherein an amplitude A of the test signal has an envelope curve variation which at first rises during a rising phase ($PH_{an}$) and then remains constant for a definite number of periods during a measurement phase ($PH_{Mess}$),
  b. measuring a current value i in a strand during the measurement phase ($PH_{Mess}$) as a current response to the test signal,
  c. calculating the envelope curve of the current response and
  d. determining the rotor position $\gamma_0$ of a rotor with a rotor diameter $r_{Rotor}$ of a fan driven by the EC motor with an impeller diameter $D_{Ventilator}$, a minimum number $N_A$ of periods is determined as a rounded-off quotient of the impeller half-diameter $D_{Ventilator}$ and the rotor diameter $r_{Rotor}$, by evaluating a curve maxima of the envelope curve of the current response; and
  e. determining a radian frequency $\omega=2\pi f_{TEST}$ of the voltage vector according to an excitation frequency between a minimum and maximum frequency, which is determined by means of frequency analysis.

* * * * *